(12) United States Patent
Musevic et al.

(10) Patent No.: US 9,263,843 B2
(45) Date of Patent: Feb. 16, 2016

(54) SPHERICAL LIQUID-CRYSTAL LASER

(75) Inventors: Igor Musevic, Ljubljana (SI); Matjaz Humar, Sempeter pri Gorici (SI)

(73) Assignee: INSTITUT JOZEF STEFAN, Ljubljana (SI)

( * ) Notice: Subject to any disclaimer, the term of this patent is extended or adjusted under 35 U.S.C. 154(b) by 93 days.

(21) Appl. No.: 13/882,514

(22) PCT Filed: Nov. 8, 2011

(86) PCT No.: PCT/EP2011/005607
§ 371 (c)(1),
(2), (4) Date: Apr. 30, 2013

(87) PCT Pub. No.: WO2012/062450
PCT Pub. Date: May 18, 2012

(65) Prior Publication Data
US 2013/0223467 A1    Aug. 29, 2013

(30) Foreign Application Priority Data

Nov. 10, 2010 (SL) .................................. 201000377

(51) Int. Cl.
| | |
|---|---|
| *H01S 3/06* | (2006.01) |
| *H01S 3/14* | (2006.01) |
| *H01S 3/02* | (2006.01) |
| *H01S 3/16* | (2006.01) |
| *H01S 3/102* | (2006.01) |
| *H01S 3/105* | (2006.01) |
| *H01S 3/106* | (2006.01) |

(52) U.S. Cl.
CPC .............. *H01S 3/022* (2013.01); *H01S 3/0627* (2013.01); *H01S 3/1686* (2013.01); *H01S 3/1028* (2013.01); *H01S 3/1053* (2013.01); *H01S 3/1065* (2013.01)

(58) Field of Classification Search
CPC ............................. H01S 3/1686; H01S 3/0627
See application file for complete search history.

(56) References Cited

U.S. PATENT DOCUMENTS

| 4,829,537 A | 5/1989 | Baer ................................ 372/66 |
| 2006/0227842 A1 | 10/2006 | Townsend et al. .............. 372/69 |
| 2007/0147213 A1* | 6/2007 | Hikmet et al. .................. 369/94 |

OTHER PUBLICATIONS

International Search Report mailed Apr. 17, 2012 in corresponding application No. PCT/EP2011/005607.
Written Opinion mailed May 10, 2013 in corresponding application No. PCT/EP2011/005607.
*Electrically tunable liquid crystal optical microresonators*; Humar et al.; Nature Photonics; vol. 3, No. 10; 2y Sep. 2009; pp. 595-600.

(Continued)

*Primary Examiner* — Jessica Stultz
*Assistant Examiner* — Marcia Golub-Miller
(74) *Attorney, Agent, or Firm* — Renner Kenner Greive Bobak Taylor & Weber (57) ABSTRACT

The patent refers to one or more droplets of chiral liquid crystals used as point source(s) of laser light. The source is shaped as a droplet of chiral liquid crystals (1) and an active medium preferably dispersed in the liquid crystals. The source is spherical and with a size of preferably between a few nanometres and 100 micrometres. A droplet consists of chiral liquid crystals (1) that have selective reflection in the range of the active medium's emission and can be cholesteric liquid crystals, a mixture of nematic liquid crystals and a chiral dopant or any other chiral liquid-crystal phase, preferably the blue phase, the ferroelectric phase, the antiferroelectric phase, any of the ferrielectric phases or another chiral phase of a soft substance, that need not be chiral by itself.

21 Claims, 11 Drawing Sheets

(56) References Cited

OTHER PUBLICATIONS

*Liquid-crystal lasers*; Coles et al.; nature Photonics; vol. 4., No. 10; Sep. 30, 2010; pp. 676-685.

*Lasing in Photonic Crystals based on Dye-Doped Holographic Polymer-Dispersed Liquid Crystal Reflection Gratings*; Wu et al.; Japanese Journal of applied Physics; vol. 44, No. 2; Feb. 1, 2005; pp. 977-980.

*Structures of the cholesteric liquid crystal droplets with parallel surface anchoring*; Bezic et al.; Liquid Crystals; vol. 11, No. 4; 1992, pp. 593-619.

*Large Electric Tuning of WGMs in Liquid Crystal Droplets*; Humar et al.; 2009 11$^{th}$ International Conference on Transparent Optical Networks; Jun. 1, 2009; pp. 1-1.

*3D microlasers from self-assembled cholesteric liquid-crystal microdroplets*; Humar et al.; Optics Express; vol. 18, No. 26; Dec. 20, 2010; p. 26995.

*Paintable band-edge liquid crystal lasers*; Gardiner et al.; Optics Express; vol. 19, No. 3; Jan. 31, 2011; p. 2432.

*Polarization dependent Bragg diffraction and electro-optic switching of three-dimensional assemblies of Nematic liquid crystal droplets*; Fernandez-Nieves, Link & Weitz; Applied Physics Letters 88; 121911 (2006); doi: 10.1063/1.2187430.

*Monodisperse Emulsion Generation via Drop Break Off in a Coflowing Stream*; Umbanhowar, Prasad & Weitz; American Chemical Society; Langmuir 2000, 16, pp. 347-351.

*Dripping, Jetting, Drops, and Wetting: The Magic of Microfluidics*; Utada, Chu, Fernandez-Nieves, Link, Iioltze & Weitz; MRS Bulletin, vol. 32; Sep. 2007, pp. 702-708.

*Polymer Dispersed Liquid Crystals: Nematic Droplets and Related Systems*; Crawford, Doane & Zumer; Handbook of Liquid Crystal Research, Chapter 9, pp. 347-355, and 405-414; Oxford University Press; 1997.

\* cited by examiner

SPHERICAL LIQUID-CRYSTAL LASER

CROSS-REFERENCE TO RELATED APPLICATION

This is a §371 application of International patent application number PCT/EP2011/005607, filed Nov. 8, 2011, which claims the benefit of Slovenian patent application number P201000377 filed on Nov. 10, 2010, both of which are incorporated herein by reference.

TECHNICAL FIELD

The invention is intended for producing lasers, more specifically, the area of producing dye lasers.

BACKGROUND ART

Modern technology for producing microelectronic and optoelectronic circuits allows the efficient production of microlasers. Diode semi-conducting microlasers are especially well known, as they are the most frequently used type of lasers. When charged with electricity the thin layer around the semi-conducting p-n junction functions as an active medium emitting light. This active laser region has to be within the resonant cavity that can be made in several different ways. With respect to the type of resonator, the main types of semi-conducting lasers are Fabry-Pérot, DFB and VCSEL.

The Fabry-Perot laser is the simplest and currently the most widely used. Its resonant cavity is made by breaking the semi-conductor crystals containing the p-n junction on both sides and along the crystal structure. In this way we create two completely flat, parallel surfaces functioning as mirrors. The light travels along the p-n junction, being reflected several times from these surfaces before leaving the diode as a laser beam.

In the case of DFB (distributed feedback) lasers the light also travels along the junction. Here, the mirrors on both ends of the diode are made by etching a diffraction grating into it. This diffraction grating has a periodic structure of high and low refractive indexes known as a one-dimensional Bragg mirror, which can, due to the interference of light, selectively reflect a specific wavelength—the one at which the laser emits light. In this way we create better mirrors than in the case of Fabry-Pérot lasers, as here the laser has a narrower spectral line.

Unlike the above-mentioned lasers the VCSEL (vertical-cavity surface-emitting laser) emits the laser light perpendicular to the p-n junction. In this case the resonant cavity has to be made in such a way that its resonant effect is the largest in the direction perpendicular to the junction; for this reason, the mirrors are in the junction plane. The mirrors are made by the alternate deposition of flat layers of solids with alternating, high and low refractive indexes. The physical principle of reflection is the same as in the case of DFB lasers, only that here the direction and the production method are different.

All the above types of the resonant cavity are one-dimensional optical microresonators that can also be named linear microresonators. These limit the light waves to only one direction, i.e., to the direction perpendicular to the mirrors.

Furthermore, production methods for microlasers based on whispering-gallery microresonators are known. In this case small transparent spheres or droplets can behave as optical resonators. If the refractive index of the medium inside the droplet is larger than the external refractive index, the light can totally reflect off the boundary back to the droplet. In this way we get circular orbits of light reflecting many times and totally off the surface and coming back to the same point. If the length of an orbit equals multiple wavelengths, the resonant condition is met and the droplet functions as an optical microresonator. Usually, the light source in a resonator is simply a fluorescent dye dispersed in the droplet and pumped with the external light. The light spectrum emitted by a droplet includes the resonance peaks corresponding to the circular resonance orbits. If a droplet is pumped with a pulsed laser and the dye is such that it has an effect of stimulated emission, the threshold for laser operation is exceeded. Now the resonator emits single or multi-mode light.

From the reference literature we have been, for some time, also well acquainted with the methods of producing dye lasers based on cholesteric (chiral nematic) liquid crystals and on liquid-crystal blue phases. A review of dye lasers based on cholesteric liquid crystals doped with a laser dye is given in the review article by Harry Coles and Stephen Morris, *Liquid-crystal lasers*, Nature Photonics, Vol. 4, 676-685, (2010). The main principle of the functioning of a dye laser based on cholesteric liquid crystals is based on a one-dimensional helical structure of the cholesteric phase that is formed spontaneously and is characteristic of this phase. Due to a large optical anisotropy, i.e., the difference between the rates of light propagation along and across the cholesteric molecules, the helical structure of the molecules in the cholesteric phase represents an optical medium, whose refractive index is periodically changed along the helix. This medium thus spontaneously creates a one-dimensional, optically modulated structure, the period of which is between the orders of 100, nm and 100 ,μm and can be altered by selecting a substance or by mixing several different substances. The consequence of the one-dimensional modulation of the refractive index is the appearance of the forbidden band in the dispersion relation for the propagation of light along the helix, also called the photonic bandgap. The propagation of the light, the frequency of which is in the forbidden frequency band, is not allowed in such a substance. It is a special characteristic of such a substance that the light falling on cholesteric liquid crystals, in the direction of the helix, reflects if its frequency (and indirectly its wavelength) falls in the forbidden dispersion band. The cholesteric phase, thus, creates one-dimensional (1D) photonic crystals. Such 1D photonic crystals can be used as Bragg mirrors that limit the space and create a 1D optical laser resonator. We also know of special variations of Bragg mirrors based on the cholesteric phase, where we use a pair of identical cholesteric mirrors, while putting a thin dielectric layer between them. Such a structure also creates a 1D optical laser resonator, where the laser's functioning is achieved by doping the liquid crystals or the thin dielectric layer with the laser dye. All such dye lasers based on cholesteric liquid crystals emit coherent laser light in a precisely determined direction.

In the reference literature we can find two technical solutions for a 3D spherical laser emitting coherent laser light evenly to all directions in space. In the patent-registration documentation U.S. Pat. No. 4,829,537,, Th. M. Baer describes a technical solution for a spherical laser based on a spherical resonator made from a solid, laser-active substance. The spherical laser resonator is shaped as an isotropic sphere, produced from a laser-active material, and coated with a thin reflective layer. The optical transmittance of this reflective layer is made in such a way that it transmits all of the light, with which we can pump, through an external source, the laser-active material from the spherical resonator, while at the same time, this layer strongly reflects the wavelengths of its own electromagnetic oscillation modes formed inside the spherical resonator. The above patent registration also describes various ways of optical coupling to the external pumping light source and the pumping of the active medium, like using optical fibres or a prism. The author of the invention gives an example of a technical solution, i.e., the Nd:YAG tiny spheres optically pumped with a diode laser. The above registration documentation does not offer any solution for an obvious problem of aligning the frequencies of its EM oscillation modes of the laser-active sphere determined with the sphere's radius, and its frequency of the stimulated emission determined by the characteristics of the active medium, in this case the Nd:YAG material. The technical weakness of the proposed spherical laser is thus the large temperature sensitivity of the amplitude of the stimulated emission of the spherical resonator with a surface reflector, which is a result of the resonator's temperature elongation.

The patent-registration documentation US 2006/0227842, A1, prepared by S. S. Townsend and R. LaComb describes a technical realisation of a spherical laser similar to the one described in the patent documentation U.S. Pat. No. 4,829,537. The authors describe a spherical transparent bowl filled with an active laser medium. The inside surface of the spherical bowl is coated with a partly reflective layer, so that the bowl can form a spherical optical resonator. The above authors explain that the stimulated emission of the active laser medium filling the resonator is induced by external influences. When the stimulated emission overcomes the losses in the resonator, we obtain an evenly distributed and emitted laser light. The authors also describe a technical solution, whereby a reflective sphere is placed in the middle of the bowl—the resonator—while the active medium fills the space forming a shell between the external bowl and the sphere in the centre of the bowl.

From the reference literature we are also well acquainted with the research into the mixtures of liquid crystals and an isotropic liquid forming special types of substances called Polymer Dispersed Liquid Crystals, abbreviated as PDLCs. In these mixtures liquid crystals and isotropic liquids do not react, so that liquid crystals spontaneously separate from the mixture forming tiny droplets. For the case of nematic liquid crystals we know of different molecule structures of liquid crystals in a droplet; we also know the structures of the droplets formed by cholesteric liquid crystals. Dispersions of tiny droplets of liquid crystals in polymer indicate a characteristic electro-optical phenomenon provided the droplets of liquid crystals are smaller than the wavelength of the visible light. In such a case the arrangement of the molecules in a droplet changes under the influence of the external electric field, also causing a change in the appearance of the thin layer of such a mixture that becomes transparent above a certain value of the electric-field strength. A review of such literature can be found in the book by Paul S. Drzaic, Liquid Crystal Dispersions (World Scientific Publishing Company, Singapore, 1995). Reference literature includes no reports on the use of tiny droplets of cholesteric liquid crystals as an optical 3D Bragg-type microresonator that could be used as a 3D source of the laser light.

SUMMARY OF THE INVENTION

It is an object of the present invention to provide a microscopic source of laser light, i.e. a source of coherent and monochromatic light that can be integrated into the processing of optical integrated circuits and spreading optical signals for the purpose of lighting objects, and also to be used in microscopy, display technology and holography. The light source intended for such purposes has to be coherent, i.e., it has to emit the light of a single wavelength, while this light has to be phase connected. Sometimes it is desirable that the laser source emits the light into all directions and that the wavelength of its emitted light can be easily changed. In other cases it is desirable that the source emits the light in particular directions, while the light is captured by one or more waveguides.

The object is achieved with the liquid-crystal laser according to the embodiments disclosed herein. Advantageous embodiments of this laser are subject matter of the dependent claims or are disclosed in the subsequent portions of the description.

The proposed source of laser light includes one or more droplets of chiral liquid crystals. Each droplet of liquid crystals is preferably but not necessarily spherical and in one of the embodiments is enveloped by a thin layer of a solid or polymer or some other substance that does not allow the liquid-crystal molecules to move to the exterior. In another embodiment the droplet of liquid crystals can also be without the impermeable layer on its surface when the exterior is filled with a substance, with which the liquid crystals do not mix, forming a clear boundary with it. The exterior of the liquid-crystal droplet is filled with gas, liquid, solid or with another type of liquid crystals, or it can also be a vacuum. The inside of the droplet is filled with chiral liquid crystals and the addition of an active laser medium. The liquid crystals inside the droplet can also be polymerized. The inner surface of the shell of the liquid-crystal droplet, or the boundary between the liquid crystals and their exterior, is made in such a way that, on this surface, the liquid-crystal molecules become arranged in parallel with the surface. Due to the chirality and the arrangement of the liquid-crystal molecules in parallel with the outer surface of the sphere, the liquid crystals inside the droplet become arranged in the shape of a helical structure, as is generally characteristic of chiral liquid crystals. This helical structure leads to a periodic variation of the directions of the main axes of the dielectric tensor in the radial direction, causing a stratification of the optical properties of a droplet in the radial direction. In the centre of the chiral liquid-crystal droplet may be a point defect, there could also be a defect line from the centre to the surface of the droplet; however, the centre of the droplet may also be filled with a spherical object or with a differently shaped object having its centre in the middle of a liquid-crystal droplet. The spherical object filling the centre of a droplet can be made of gas, a liquid that does not mix with liquid crystals, or of a solid. It can also be made of another type of liquid crystals that do not mix with the liquid crystals of the droplet. With such a centrally arranged spherical object the laser-active material can be placed in the center of the droplet. There is also an option that other materials, put in the center of the droplet, influence the parameters of lasing. Thus a control over lasing can be achieved in this way.

A droplet containing liquid crystals with the helical structure arranged in the radial direction, and an added active laser substance, whose characteristic is stimulated light emission, is illuminated from an external light source. We can illuminate only one part of the droplet if the active laser substance, in particular a laser dye, is unevenly distributed inside the droplet, preferably the droplet's centre. The active laser substance may be dispersed in the liquid crystals or also included in the droplet in another manner. The illumination is carried out in such a way that an excess of the stimulated light emission over its loss is gained above a certain density level of the pumping light flux. The radial modulation of the refractive index inside a droplet causes a Bragg reflection of the light that comes from the centre of the droplet and, due to the reflection, returns back to it. Thus, the liquid-crystal helical structure functions as a radial Bragg reflector, while the droplet functions as a radial optical resonator, whose self-resonant frequencies of the electromagnetic field are defined with the helix period of the chiral liquid crystals and with the speed of light propagation inside the liquid crystals. The emitted light appears above the laser-emission threshold, spreading evenly across the entire solid angle. We can also capture the emitted light into an optical waveguide, shaped as a dielectric object penetrating the droplet in the radial direction towards its centre. The waveguide can also penetrate the entire liquid-crystal droplet. A large number of liquid-crystal lasers can form a two- or three-dimensional network creating, in this way, a source of laser light integrated in space or on a plane.

BREIF DESCRIPTION OF THE DRAWINGS

The section below will describe several variations the proposed laser supported by the following figures.

BEST MODE FOR CARRYING OUT THE INVENTION

Figure 1:
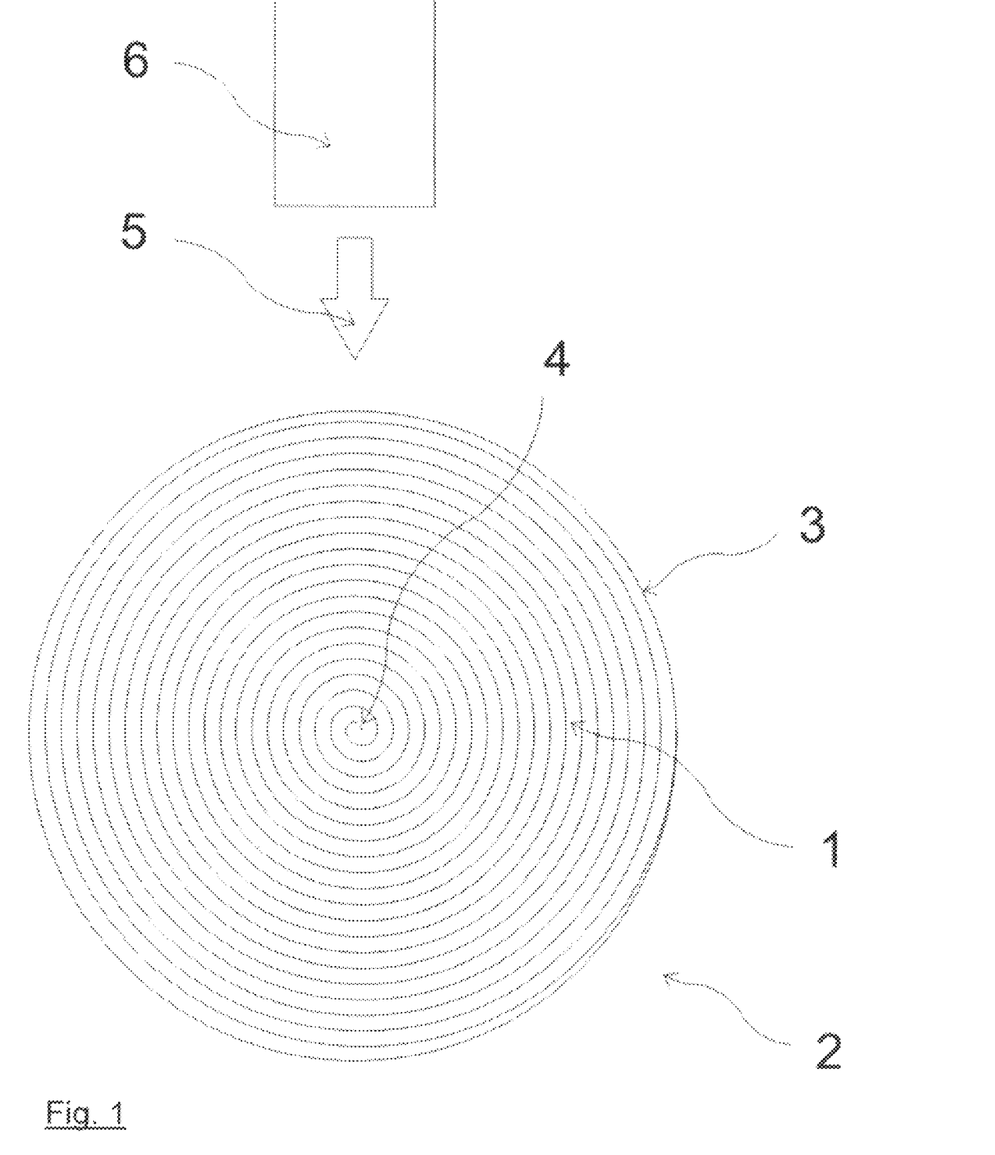
FIG. 1: Basic spherical liquid-crystal laser of the invention

FIG. 1 schematically presents the basic spherical liquid-crystal laser common to all the presented variations. The spherical liquid-crystal laser is made in the shape of a droplet with helically arranged liquid crystals 1 placed in a transparent external medium 2 with an optically clear boundary 3 between the two elements. Due to the surface tension the droplet of cholesteric liquid crystals is shaped into a completely spherical droplet in the external liquid medium. The droplet size is preferable in the range between a few nanometers and 100, μm. Droplets can be formed by the mechanical mixing of liquid crystals and an external liquid medium or by the well-known procedures of phase separation during polymerisation or photo-polymerisation of the supporting optically isotropic medium, in which the liquid-crystal droplets are distributed.

The boundary between the external substance and the inside of a droplet is formed in such a way that the molecules of the liquid crystals at the boundary 3 spontaneously arrange themselves in the direction parallel to the surface of the boundary between the droplet and the exterior. For this reason the liquid crystals inside a droplet arrange themselves in the helical structure 1 that is typical of cholesteric liquid crystals. This structure finishes in the droplet's centre 4, so that the helical structure of liquid crystals is arranged in the radial direction from the droplet's surface to its centre. Cholesteric liquid crystals can be purely cholesteric or a mixture of nematic liquid crystals and a chiral dopant or any other chiral, i.e., a helical liquid-crystal phase, such as the blue phase, the ferroelectric smectic phase, the antiferroelectric smectic or the ferrielectric smectic phases and similar chiral phases of soft substances. Cholesteric liquid crystals can also form a substance that can be polymerised, which means that after the polymerisation a droplet becomes a solid sphere. An active medium is dispersed in cholesteric liquid crystals acting as an optical amplifier in a spherical liquid-crystal laser. Active mediums can be organic fluorescent dyes, rare-earth ions or other ions, quantum dots or other fluorescent media.

Figure 2:
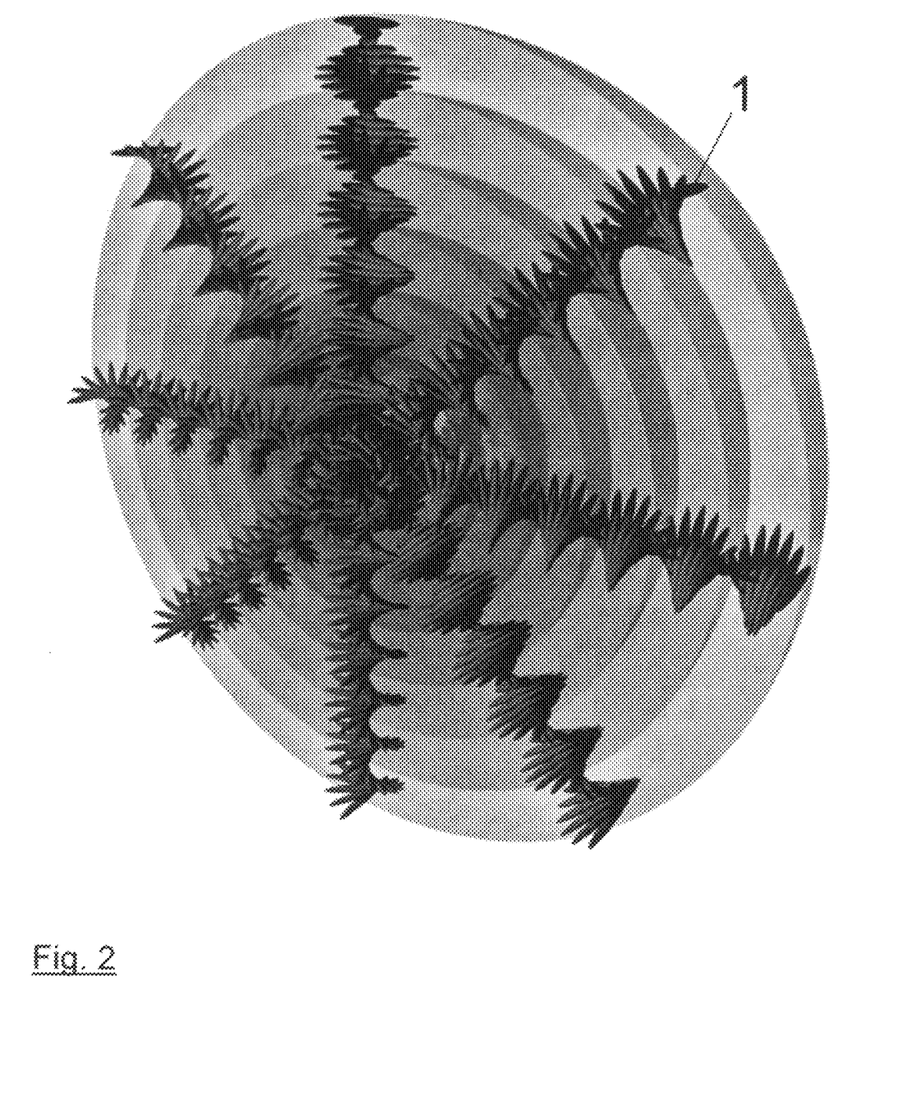
FIG. 2: Helical arrangement of cholesteric liquid crystal molecules inside the spherical liquid-crystal laser.

FIG. 2 schematically presents the orientation of the liquid-crystal molecules 1 in a liquid-crystal laser. The orientation of the liquid-crystal molecules 1 at the surface of the droplet is parallel to the surface. The chirality of liquid crystals causes spontaneous twisting of the liquid-crystal molecules in the radial direction determining, in this way, the optical properties of such a structure of liquid crystals in a droplet. The result of the radial helical arrangement is a periodic variation of the directions of the main axes of the dielectric tensor in the radial direction leading to an effective stratification of the optical properties of a droplet in the radial direction. Using simple physical concepts we can explain that the helical arrangement of a dielectric tensor is similar to a sequence of layers with high and low refractive indices being alternated along the distance from the droplet's centre to its boundary with the exterior. Liquid crystals in a droplet, thus, become spontaneously arranged in such a way that they form an onion-shaped optical structure, the refractive index of which is periodically changed along the distance from the droplet's centre towards its outer end. When travelling in the radial direction and due to the interference with the optical structure, the light in a certain interval of wavelengths reflects back and forth towards the droplet's centre and the surface. For this reason, such a structure of liquid crystals in a droplet functions as an optical resonator shaped as a radial and spherically symmetrical 3D Bragg reflector. The optical properties of a 3D Bragg reflector are defined by the period of the helix of the cholesteric phase or another chiral phase determined by selecting a particular type of liquid crystals or a mixture of liquid crystals with other substances. We select the period of the cholesteric helix in such a way that the first or the second edge of its photonic gap is in the region of the maximum emission of the used active medium.

As a liquid-crystal droplet is made in such a way that it contains a substance acting as an optical amplifier, and has an optical structure that forms a radial Bragg microresonator, it can emit laser light if the active laser medium is lit upon and pumped with the light 5 from the external source 6, the wavelength of which has to be in the range of the absorption of the active medium. The source can be a pulsed laser or flash. When the peak power of the external optical stimulation exceeds the threshold, so that the stimulated laser emission exceeds its losses, a droplet begins to emit laser light. A laser emits its light in all directions. The emitted light forms one or more sharp laser lines, the wavelength of which is determined by the period of the liquid-crystal helix. By changing the temperature we can change the length of the helix, affecting, in this way, also the wavelength of the light emitted by the laser. A similar effect of changing the wavelength of the emitted laser light can be achieved with an external electric or magnetic field affecting the structure of liquid crystals in a droplet.

The section below describes different variations of the proposed spherical liquid-crystal laser.

Figure 3:
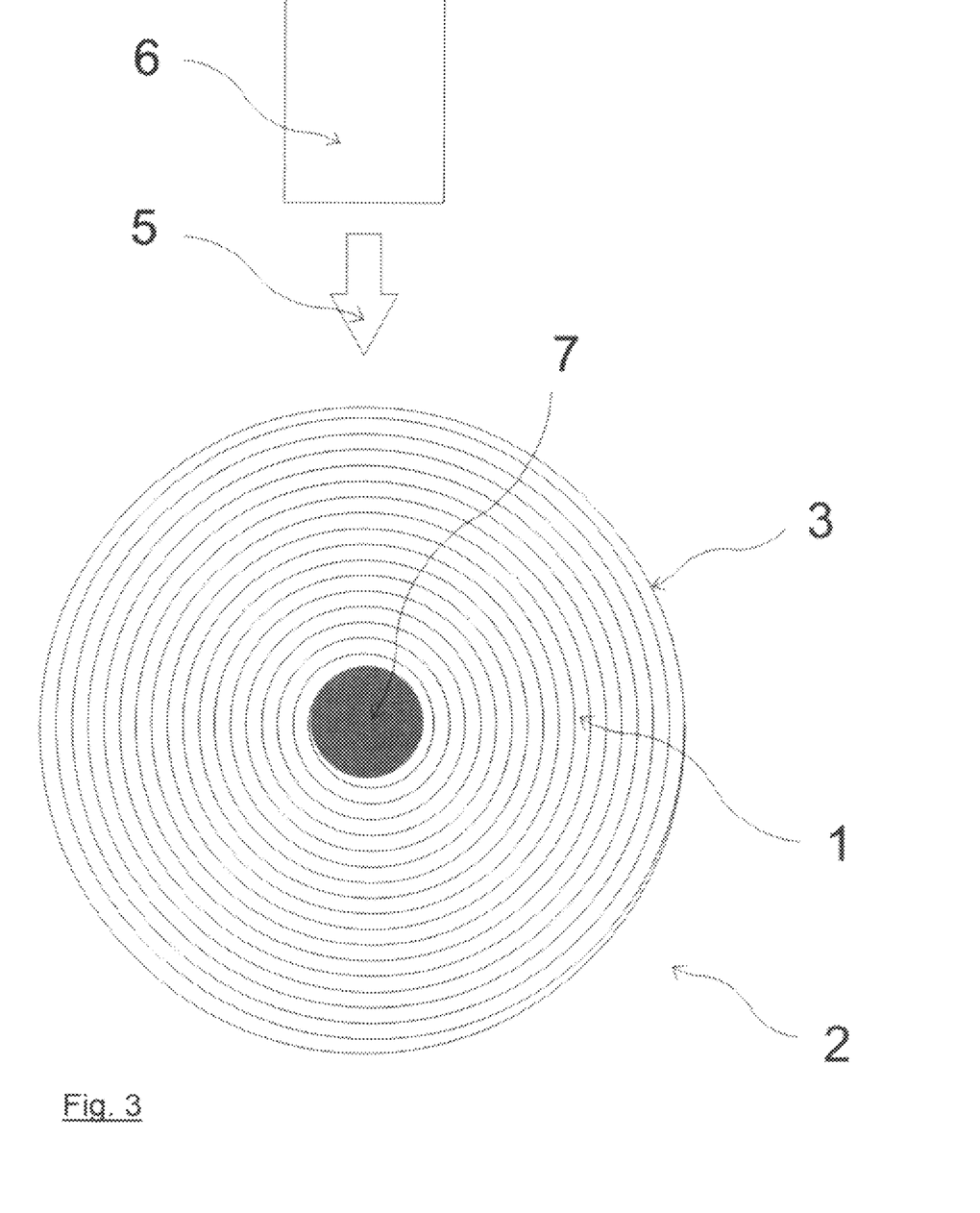
FIG. 3: Spherical liquid-crystal laser with an additional object in the centre of the liquid-crystal droplet

FIG. 3 shows variation No. 2, of a spherical liquid-crystal laser that has an additional object 7 in the centre of the liquid-crystal droplet. This object can be of a spherical or some other geometrically correct shape; it can also be completely unsymmetrical. The object can be made of a solid, or of the liquid crystals different from the crystals in the droplet that will not react with them; it can also be made of an isotropic liquid that will not react with the liquid crystals, and it can also be a gas bubble. It must be clear from the above description that the object can be made of different substances that can integrate light in different ways. It can be made of an active laser substance, of a substance for nonlinear amplification of the light frequency, of a ferroelectric or ferromagnetic substance. This object fills up a small area in the centre of the liquid-crystal droplet, where, in the case shown in FIG. 1 (variation No. 1), there is a structural defect in the orientation of the liquid crystals. However, in variation No. 2, the liquid-crystal structure of the rest of the droplet, except for its centre, is the same as in variation No. 1.

Figure 4:
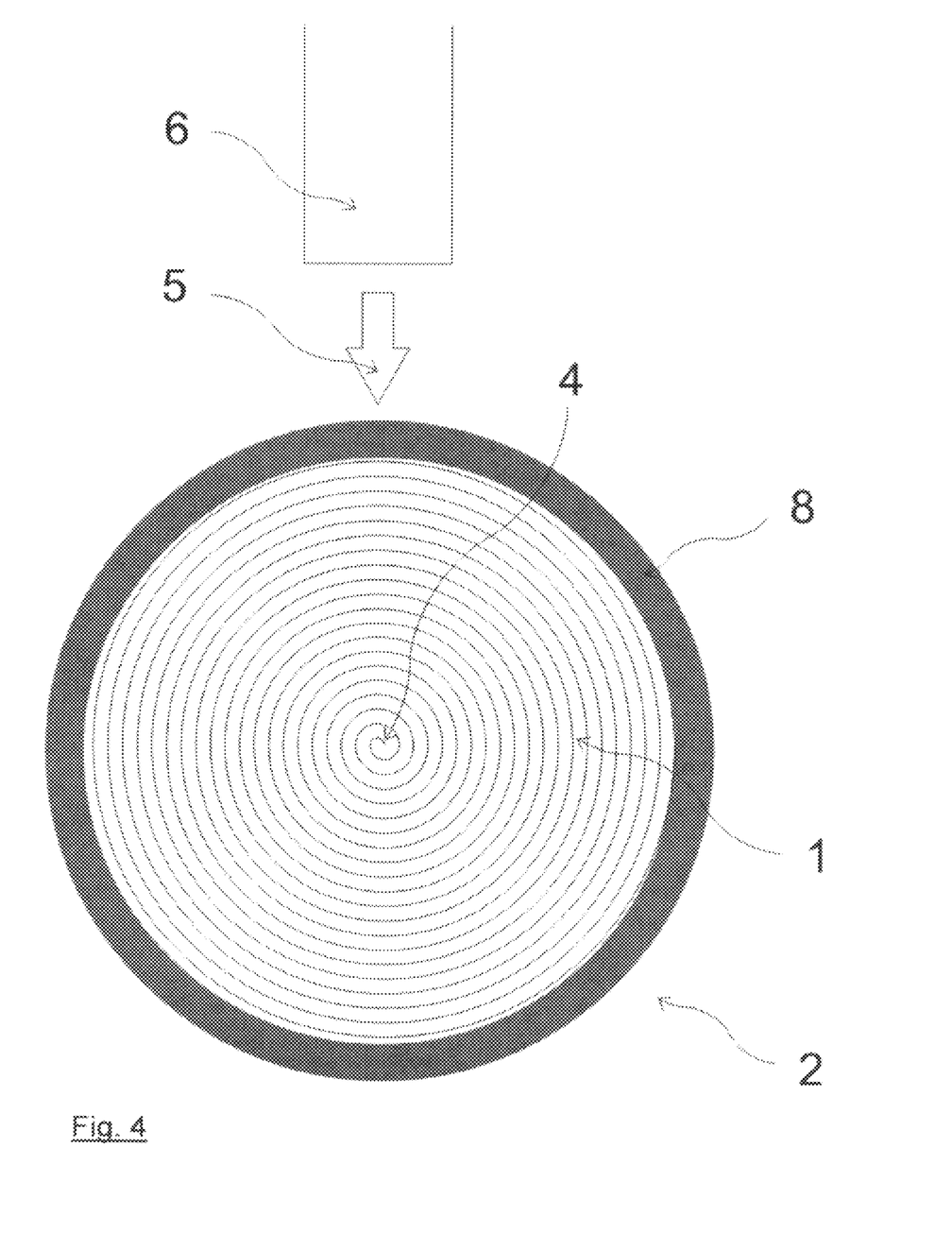
FIG. 4: Spherical liquid-crystal laser, where the liquid-crystal droplet is separated from the external medium with a thin barrier

FIG. 4 shows variation No. 3, of the spherical liquid-crystal laser, where the liquid-crystal droplet is separated from the external medium 2 by a thin barrier 8. The barrier has the function of separating the external medium from the liquid crystals inside the droplet. It is made with the chemical processes of coating liquid-crystal droplets that are well known from PDLC technology. Barrier 8 has to be transparent and impermeable to the molecules of liquid crystals 1 or external medium 2.

Figure 5:
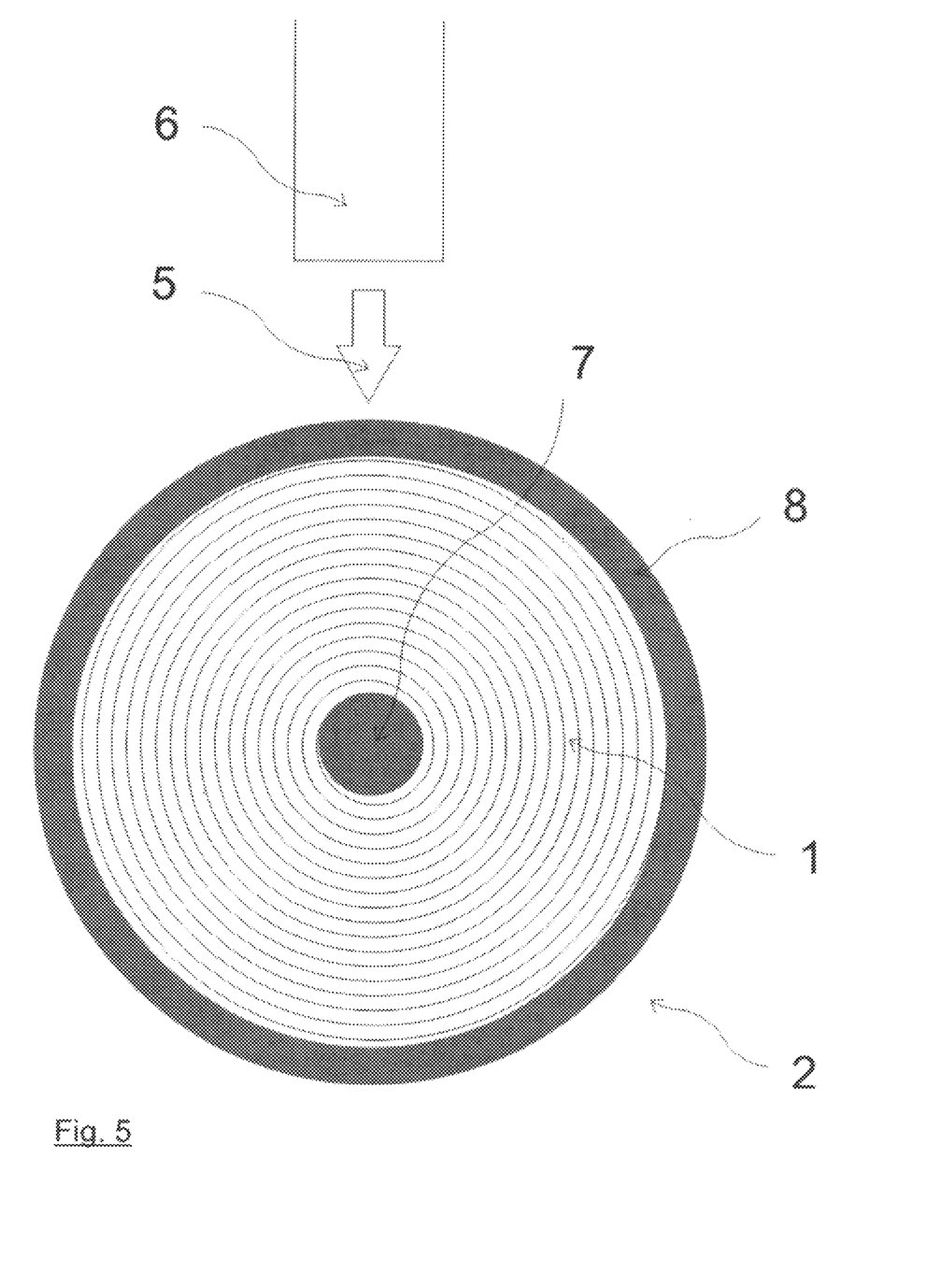
FIG. 5: Spherical liquid-crystal laser with an additional object in the centre of the liquid-crystal droplet and the barrier separating the liquid-crystal droplet from the external medium

FIG. 5 shows variation No. 4, joining variations Nos. 2, and 3. Here the liquid crystals are also kept inside barrier 8 separating the external medium 2 from the cholesteric crystals 1. Object 7 is placed in the centre of the droplet. The active laser medium is distributed in liquid crystals and/or in the object placed in the droplet's centre. The active laser medium is lit by the external light 5 coming from the light source 6.

Figure 6:
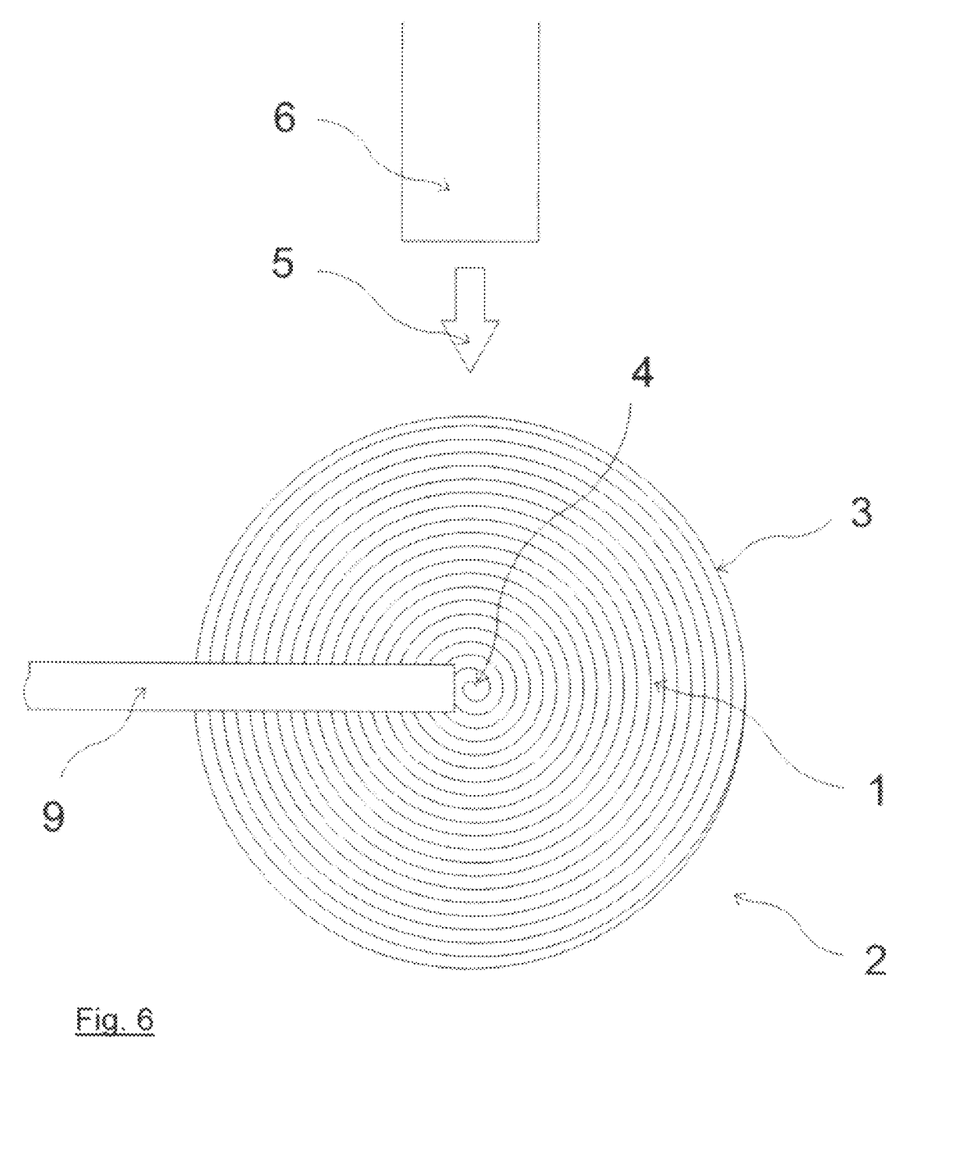
FIG. 6: Spherical liquid-crystal laser with an optical waveguide inserted in the liquid-crystal droplet

FIG. 6 shows variation No. 5, based on version No. 1,, having an optical waveguide 9 inserted in the cholesteric liquid-crystal droplet 1. In this case the active laser medium is distributed across the liquid crystals 1, being lit at some angle by the pumping light 5 coming from the light source 6. The light coming from the centre of the spherical laser is captured and guided by waveguide 9.

Figure 7:
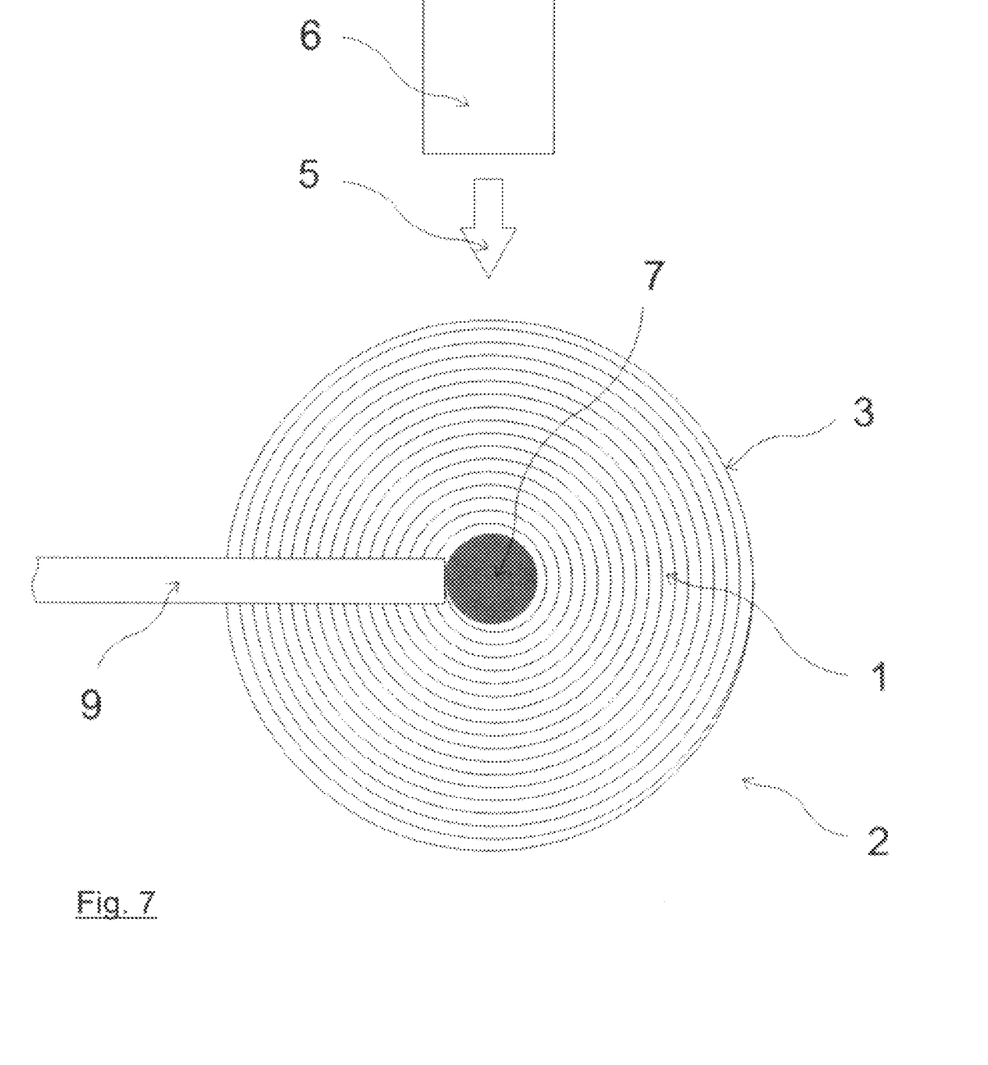
FIG. 7: Spherical liquid-crystal laser with an optical waveguide inserted in the liquid-crystal droplet and an additional object in the centre of the liquid-crystal droplet

FIG. 7 shows variation No. 6, joining variations Nos. 2, and 5. Here waveguide 9 is inserted in the droplet, capturing, inputting or outputting the light. Dielectric object 7 is placed in the droplet's centre; it contains an active laser medium and/or another substance involved, in some other way, with the electromagnetic field of the resonator. The active laser medium can also be distributed across the liquid crystals inside droplet 1. We pump the active laser substance with external light 5 from light source 6, and capture the laser-generated light in the centre of the droplet, i.e., the resonator, guiding it from the laser with waveguide 9.

Figure 8:
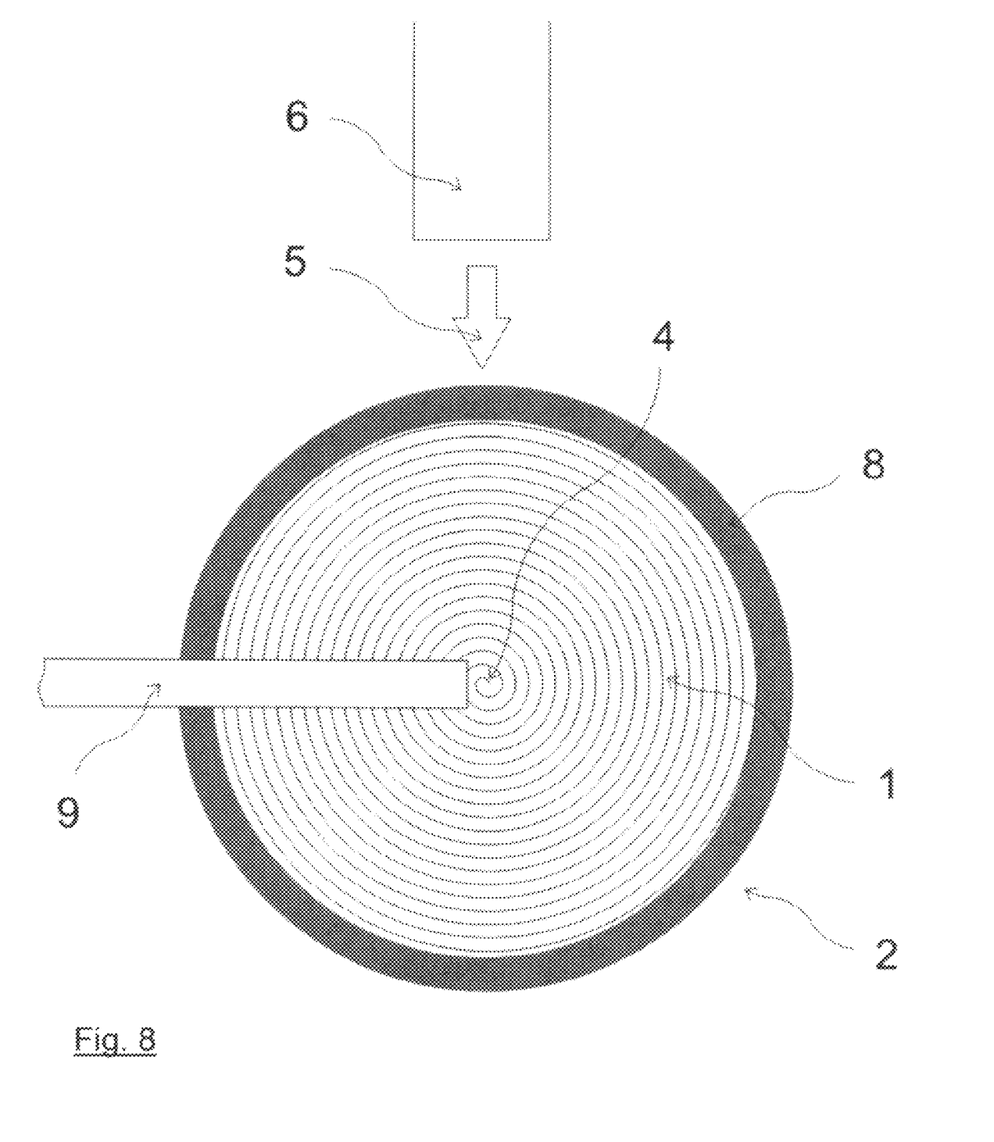
FIG. 8: Spherical liquid-crystal laser with an optical waveguide inserted in the liquid-crystal droplet and the barrier separating the liquid-crystal droplet from the external medium

FIG. 8 shows the variation of a spherical liquid-crystal laser No. 7,, joining variations Nos. 3, and 5. Here the liquid-crystal droplet is separated with a thin barrier 8 from the external medium 2. The function of barrier 8 is to separate the external medium from the liquid crystals inside the shell. Optical waveguide 9 is inserted in the cholesteric liquid-crystal droplet 1.

Figure 9:
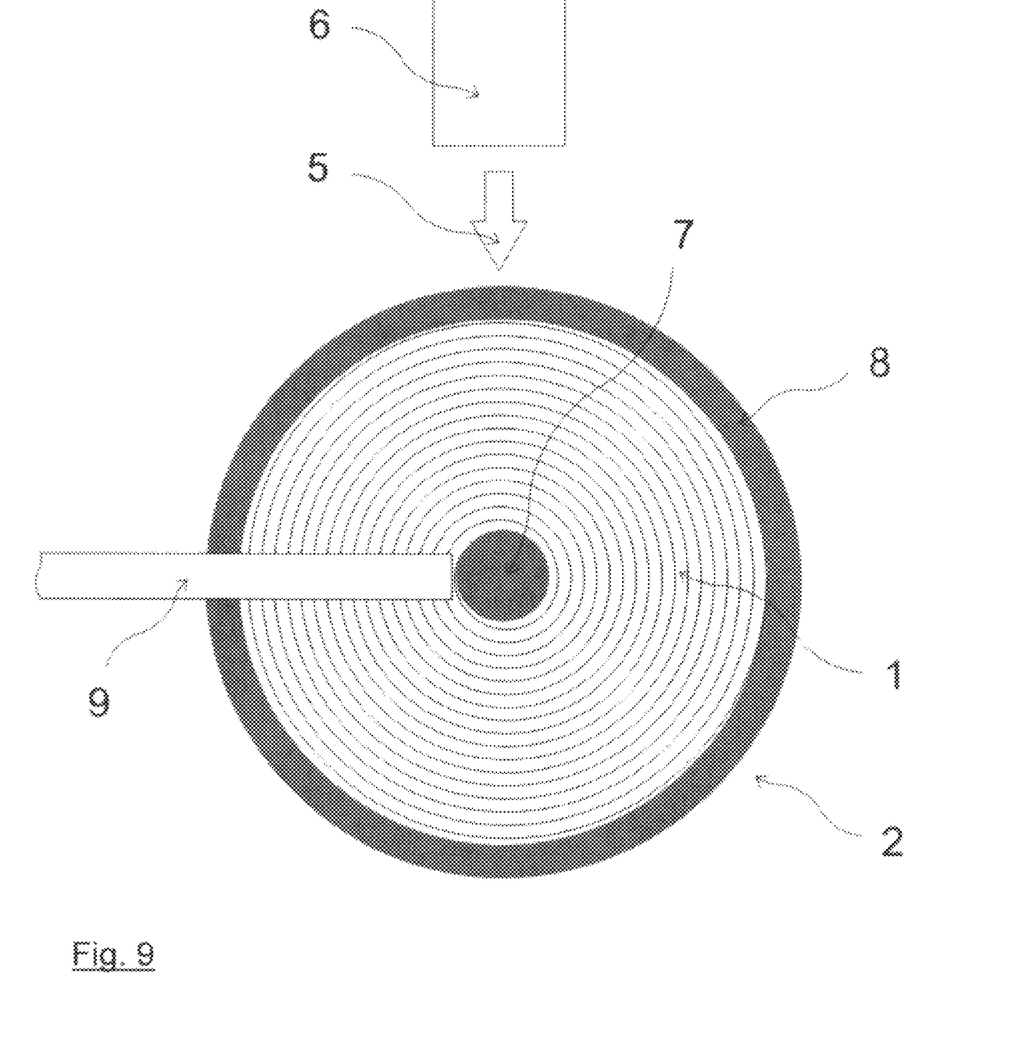
FIG. 9: Spherical liquid-crystal laser with an optical waveguide inserted in the liquid-crystal droplet, the barrier separating the liquid-crystal droplet from the external medium and an additional object in the centre of the liquid-crystal droplet

FIG. 9 shows the variation of a spherical liquid-crystal laser No. 8,, joining variations Nos. 6, and 7. The liquid-crystal droplet is separated with a thin barrier 8 from the external medium 2. The function of barrier 8 is to separate the external medium from the liquid crystals inside the shell. Optical waveguide 9 is inserted in the cholesteric liquid-crystal droplet 1. Dielectric object 7 is placed in the droplet's centre; it contains an active laser medium and/or another substance involved, in some other way, with the electromagnetic field of the resonator. The active laser medium can also be distributed across the liquid crystals inside droplet 1.

Figure 10:
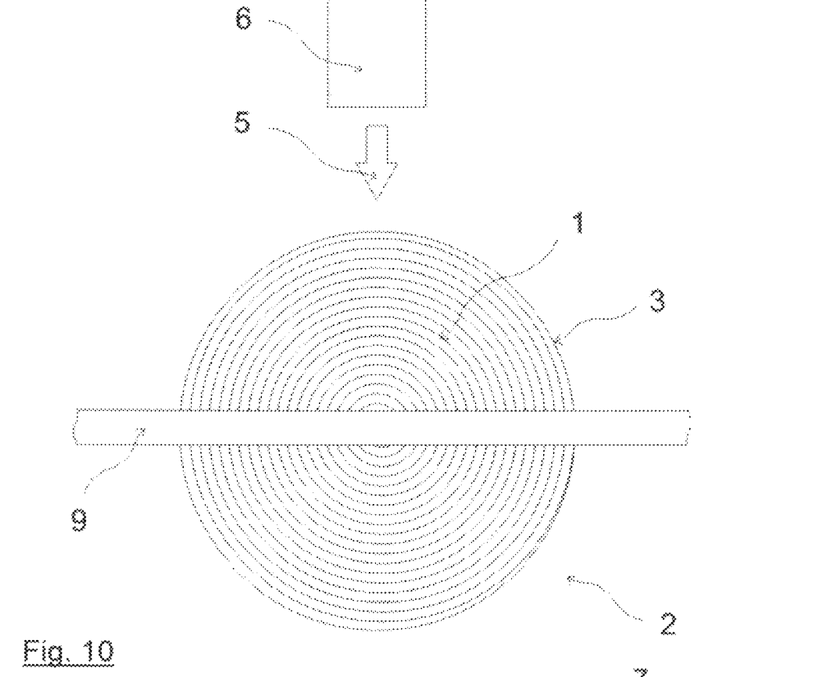
FIG. 10: Spherical liquid-crystal laser with an inserted optical waveguide penetrating the spherical laser along the axis of symmetry

FIG. 10 shows the variation of a spherical liquid-crystal laser No. 9, with an inserted optical waveguide penetrating the spherical laser along the axis of symmetry. The active laser substance is distributed across the liquid crystals 1. Light pumping is carried out by sending pumping light 5 from light source 6. We capture the laser light from the spherical laser when, due to the resonant reflection from the spherical Bragg reflector, it gets caught in the waveguide and, through it, leaves the laser.

Figure 11:
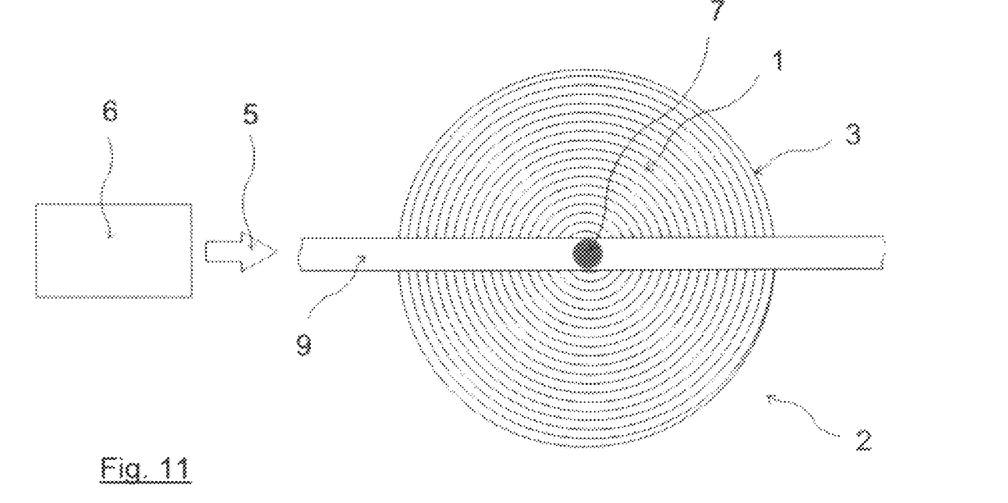
FIG. 11: Spherical liquid-crystal laser with an inserted optical waveguide penetrating the spherical laser along the axis of symmetry and with an additional object made of an active laser substance placed in the waveguide and in the centre of the liquid-crystal droplet

FIG. 11 shows the variation of the spherical liquid-crystal laser No. 10, with an inserted optical waveguide penetrating the spherical laser along its axis of symmetry. The active laser substance is distributed on a small object placed in the centre of the droplet. This object can have a geometrically correct shape, preferably of a small sphere or a cylinder with its axis parallel to the axis of the waveguide. The object can also be without any special symmetry. The substance from which it is made has, in addition to the active-laser properties, also the property of non-linear amplification of the frequency of electromagnetic waves, being ferroelectric or ferromagnetic; it can also be superparamagnetic. We pump the light by sending pumping light 5 from the light source 6 along the waveguide 9 to the active laser substance 7. We capture the laser light from the spherical laser when, due to the resonant reflection on the spherical Bragg reflector, it gets caught in the waveguide and, through it, leaves the laser.

Figure 12:
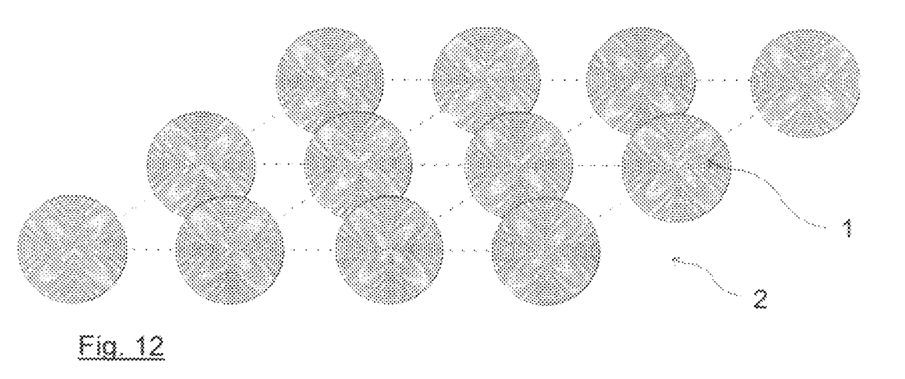
FIG. 12: A number of spherical liquid-crystal lasers arranged in a two-dimensional network

FIG. 12 shows a number of spherical liquid-crystal lasers arranged in a two-dimensional network. Liquid-crystal lasers can be arranged, in the external medium, in the plane in such a way that their geometric centres of gravity form a correct two-dimensional network that can be symmetrical or quasi-symmetrical. Individual liquid-crystal lasers can be any of the above versions Nos. 1-10. Such a laser structure functions as a set of laser-light sources integrated in the plane. However, an expert in this area understands that, in some cases, these spherical lasers do not need to be integrated in the plane. In such cases they are randomly arranged in the plane.

Figure 13:
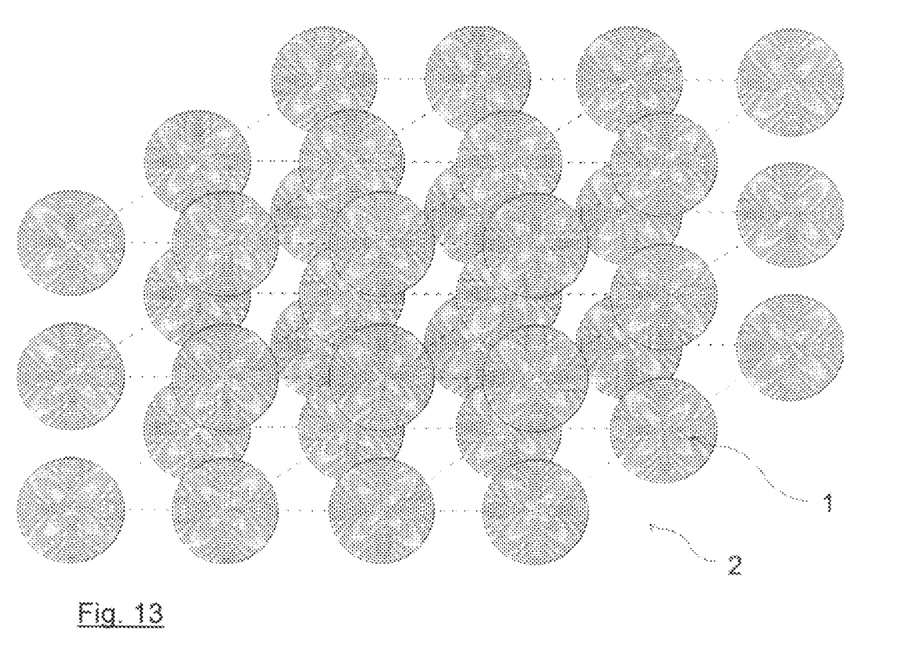
FIG. 13: A number of spherical liquid-crystal lasers arranged in a three-dimensional network

FIG. 13 shows a large number of spherical liquid-crystal lasers arranged in a three-dimensional network. Liquid-crystal lasers can be arranged, in the external medium, in space in such a way that they form a three-dimensional network that can be symmetrical, quasi-symmetrical, or with no symmetry. Individual liquid-crystal lasers can be any of the above versions Nos. 1-10. Such a laser structure functions as a set of laser-light sources integrated in space. However, an expert in this area understands that, in some cases, these spherical lasers do not need to be integrated in space. In such cases, spherical lasers are randomly arranged in space.

In the following, two examples of preparation of fluorescent dye-doped cholesteric liquid crystal mixtures are described:

1.) 25.5, wt % of S-811, chiral dopant (Merck) is added to the MLC-7023, liquid crystal (Merck). The mixture is heated into the isotropic phase and mixed for typically several minutes to homogenize. Then, 0.2, wt % fluorescent dye 7-diethylamino-3,4-benzophenoxazine-2-one (Nile red) is added to this mixture, heated into the isotropic phase and mixed until homogenized, typically for several minutes. After homogenization, the dye-doped chiral nematic liquid crystal is centrifuged to remove any solid residual dye particles. Typically the material is centrifuged for a couple of minutes at 10.000, rpm and the spinning radius is typically several centimeters.

2.) MLC-2132, liquid crystal (Merck) with 26, wt % S-811, chiral dopant (Merck) and 0.5, wt % laser dye 4-dicyanomethylene-2-methyl-6-(p-dimethylaminostyryl)-4H-pyran (DCM).

For the fabrication of 3D micro lasers in both cases, few percent, of dye-doped cholesteric liquid crystal mixture is mechanically mixed with glycerol forming small droplets of different sizes. No special mixing protocols need to be used, as the dispersion readily forms, even when mixing it manually.

The spherical liquid-crystal laser from our invention is a droplet of liquid crystals—the refractive index of which is locally dependent in the radial direction and forms optically different concentric layers—with an active medium preferably dispersed in the liquid crystals that, when stimulated with external light, emits laser light. This laser is substantially spherical and preferably has the size of a few nanometres to 100, micrometres. A droplet consists of chiral liquid crystals 1 that have a selective reflection in the region of the active medium's emission and can be cholesteric liquid crystals, a mixture of nematic liquid crystals and a chiral dopant or any other chiral liquid-crystal phase, preferably the blue phase, ferroelectric phase or another chiral phase of a soft substance. An active laser medium is preferably dispersed in the chiral liquid crystals. Active mediums can be organic fluorescent dyes, rare-earth ions or other ions, quantum dots or other fluorescent media. The helical structure of liquid crystals is arranged in a radial direction from the droplet's surface 3 to its centre 4. A liquid-crystal droplet has concentric preferably cholesteric layers functioning as a selective mirror for the light travelling in the radial direction and creating a spherical Bragg resonator. The liquid-crystal droplet is placed in the transparent external medium 2 that can be a gas, a liquid, a solid, another type of liquid crystals or a vacuum. The external medium arranges the liquid-crystal molecules at the boundary between the exterior and the interior of the droplet in such a way that they are parallel to the droplet's surface. The liquid-crystal droplet is made by mechanical mixing of the liquid crystals and the external medium, or with the processes of phase separation that take place during the temperature change, the polymerisation or photo-polymerisation of the supporting optically isotropic medium 2, in which liquid-crystal droplets are distributed. In the centre of the liquid-crystal droplet there may be a spherical object 7 or an object of a different shape made of gas, liquid or liquid crystals that do not react with the droplet's liquid crystals, or of a solid. The light coming from the laser expands evenly in all directions. Emitted light can be captured in optical waveguide 9 that is a cylindrical dielectric object penetrating the droplet in the radial direction towards its centre. Waveguide 9 can also penetrate the entire liquid-crystal droplet and can contain object 7 made of an active laser substance. The laser is stimulated with the strong external light 5 that is in the absorption range of the fluorescent dye reaching the droplet from one or more directions through the external medium 2 or through waveguide 9. By changing the temperature, the external electric or magnetic field it is possible to change the length of the helix and, in this way, also change the wavelength of the light emitted by the laser. A large number of lasers can be arranged in one-dimensional, two-dimensional or three-dimensional networks that show translational and/or rotational symmetry, quasi-symmetry (tiling), or they show no translational or rotational symmetry at all.

It is characteristic of the production of such a spherical liquid-crystal laser that a liquid-crystal droplet is made by the mechanical mixing of liquid crystals and the external medium, or with the procedures of phase separation during the temperature change, the polymerisation or photo-polymerisation of the supporting optically isotropic medium 2, in which liquid-crystal droplets are distributed.

The invention claimed is:

1. A liquid-crystal laser formed of a micrometer-sized spherical droplet of liquid crystals forming a chiral phase, said droplet containing an active laser medium that, when stimulated with external light, emits laser light, wherein a refractive index of said droplet is modulated in a radial direction of the droplet forming optically different concentric layers, which act as a reflector for the laser light.

2. The laser according to claim 1, wherein the droplet consists of chiral liquid crystals, that have a selective reflection in the region of the active medium's emission.

3. The laser according to claim 2, wherein the chiral liquid crystals are cholesteric liquid crystals or a mixture of nematic liquid crystals and a chiral dopant.

4. The laser according to claim 2, wherein the active laser medium is an organic fluorescent dye, rare-earth ions, quantum dots or fluorescent medium.

5. The laser according to claim 2, wherein a helical structure of the liquid crystals extends in the radial direction from a surface of the droplet to its centre.

6. The laser according to claim 1, wherein the droplet has concentric cholesteric layers functioning as a selective mirror for the laser light travelling in a radial direction and forming a spherical Bragg resonator.

7. The laser according to claim 1, wherein the droplet is placed in an external transparent medium that can be a gas, a liquid, a solid, another type of liquid crystals or a vacuum said external medium being selected to arrange the liquid-crystal molecules at the boundary between the exterior and the interior of the droplet in parallel with a surface of the droplet.

8. The laser according to claim 7, wherein the droplet is formed by mechanical mixing of liquid crystals and the external medium, or by a process of phase separation taking place during a temperature change, a polymerisation or a photo-polymerisation of a supporting medium, in which liquid-crystals are distributed.

9. The laser according to claim 1, wherein, in a centre of the droplet, a spherical object or an object of another shape is arranged, said object being formed of a gas, a liquid, further liquid crystals that do not react with the liquid crystals of the droplet, or of a solid.

10. The laser according to claim 1, wherein an optical waveguide shaped as a cylindrical dielectric object penetrates the droplet in the radial direction towards its centre, said waveguide capturing laser light of the droplet.

11. The laser according to claim 10, wherein the waveguide penetrates the entire droplet.

12. The laser according to claim 11, wherein the waveguide contains an object made of an active laser substance forming said active laser medium.

13. The laser according to claim 9, wherein the spherical object or said object of another shape contains said active laser medium.

14. The laser according to claim 1, wherein said active laser medium is dispersed in the liquid crystals.

15. A method of operating the laser according to claim 1, wherein the laser is stimulated with strong external light that is in the absorption range of the active laser medium, said external light reaching the droplet from one or more directions through a transparent external medium, in which the droplet is placed, or through the waveguide, which penetrates the droplet in the radial direction toward its center.

16. The method of claim 15, wherein a wavelength of the laser light emitted by the laser is changed by changing the temperature, or an external electric/magnetic field.

17. A laser structure including several lasers according to claim 1, wherein a number of said lasers can be arranged in one-dimensional, two-dimensional or three-dimensional networks that show translational and/or rotational symmetry, quasi-symmetry (tiling), or that show no translational or rotational symmetry at all.

18. A process of producing a liquid-crystal laser according to claim 1, wherein a liquid-crystal droplet is formed by mechanical mixing of liquid crystals and an external medium or by using procedures of phase separation during a temperature change, a polymerisation or a photo-polymerisation of a supporting optically isotropic medium, in which the liquid-crystal droplets are distributed.

19. The laser according to claim 1, wherein the liquid crystals inside the droplets are polymerized.

20. The laser according to claim 2, wherein the chiral liquid crystals form a blue phase, a ferroelectric phase, an antiferroelectric smectic phase, a ferrielectric smectic phase, a chiral phase of a soft substance or a chiral liquid-crystal phase made of non-chiral molecules.

21. The laser according to claim 1, wherein the droplet has a diameter of between 15 and 50 micrometers.

* * * * *